United States Patent [19]

Bonino et al.

[11] Patent Number: 5,309,257
[45] Date of Patent: May 3, 1994

[54] METHOD AND APPARATUS FOR PROVIDING COLOR MATCHING BETWEEN COLOR OUTPUT DEVICES

[75] Inventors: Bruce S. Bonino, Hemlock, N.Y.; Robert Steinberg, Valencia; Randall L. Owen, Canyon Country, both of Calif.

[73] Assignee: Eastmn Kodak Company, Rochester, N.Y.

[21] Appl. No.: 817,797

[22] Filed: Dec. 31, 1991

[51] Int. Cl.⁵ .............................................. H04N 1/46
[52] U.S. Cl. ................................... 358/504; 358/523; 358/524; 358/527; 358/518; 358/406; 395/131
[58] Field of Search ..................... 358/406, 75, 76, 80, 358/504, 523, 527, 518, 524; 395/109, 112, 131; 364/526; 340/703, 700

[56] References Cited

U.S. PATENT DOCUMENTS

| | | | |
|---|---|---|---|
| 4,037,249 | 7/1977 | Pugsley | 358/504 |
| 4,500,919 | 2/1985 | Schreiber | 358/518 |
| 4,583,186 | 4/1986 | Davis et al. | 364/526 |
| 4,639,770 | 1/1987 | Jung et al. | 358/80 |
| 4,670,780 | 6/1987 | McManus et al. | 358/80 |
| 4,734,763 | 3/1988 | Urabe et al. | 358/521 |
| 4,812,879 | 3/1989 | Suzuki | 358/76 |
| 4,839,721 | 6/1989 | Abdulwahab et al. | 358/518 |
| 4,839,722 | 6/1989 | Barry et al. | 358/523 |
| 4,875,032 | 10/1989 | McManus et al. | 340/703 |
| 4,926,254 | 5/1990 | Nakotsuka et al. | 358/527 |
| 4,945,405 | 7/1990 | Hirota | 358/516 |
| 4,945,406 | 7/1990 | Cok | 358/75 |
| 4,958,220 | 9/1990 | Alessi et al. | 358/527 |
| 4,979,032 | 12/1990 | Alessi et al. | 358/527 |
| 4,985,853 | 1/1991 | Taylor et al. | 358/80 |
| 4,992,862 | 2/1991 | Gabor | 358/80 |
| 5,047,864 | 9/1991 | Fujito | 358/76 |
| 5,081,529 | 1/1992 | Collette | 358/80 |
| 5,123,083 | 6/1992 | Shimomura | 358/80 |
| 5,146,328 | 9/1992 | Yamasaki et al. | 358/80 |
| 5,148,288 | 9/1992 | Hannah | 358/80 |

Primary Examiner—Edward L. Goles, Sr.
Assistant Examiner—Fan Lee
Attorney, Agent, or Firm—Mark Z. Dudley; Thomas H. Close

[57] ABSTRACT

A method and apparatus are disclosed for providing color matching between populations of color output devices, such as color monitors and color printers. The method includes the steps of establishing a set of aim curves for each population of color output devices based on measured color luminance values of each member of the population, and constructing first and second sets of color correction transforms for each of the color output devices based on the aim curves and the measured color luminance values. The correction transforms are then provided to the device driver of each of the color output devices. The method and apparatus can transform the color outputs of a population of color output devices from a device-dependent color gamut to a population dependent color gamut.

34 Claims, 5 Drawing Sheets

METHOD AND APPARATUS FOR PROVIDING COLOR MATCHING BETWEEN COLOR OUTPUT DEVICES

CROSS-REFERENCE TO RELATED APPLICATIONS

The present application is related to a U.S. patent application entitled COLOR IMAGE PROCESSING SYSTEM FOR PREPARING A COMPOSITE IMAGE TRANSFORMATION MODULE FOR PERFORMING A PLURALITY OF SELECTED IMAGE TRANSFORMATIONS having now U.S. Ser. No. 07/717,099 to Newman, et al., and to U.S. Pat. No. 4,958,220 entitled COLOR IMAGING APPARATUS PRODUCING VISUALLY MATCHED DISPLAYS OF PERCEPTUALLY DISTINCT REPRODUCED IMAGES, and U.S. Pat. No. 4,979,032 entitled COLOR IMAGING APPARATUS PRODUCING ON VARIOUS IMAGE-RECEPTIVE MATERIALS A VISUALLY MATCHED HARD COPY REPRODUCTION OF THE VIDEO IMAGE DISPLAY, both to Alessi, et al., and the entire disclosures of each of these is hereby incorporated by reference.

FIELD OF THE INVENTION

The present invention relates to a method and apparatus for providing color matching between two or more color output devices, and more particularly, to a method and apparatus for transforming colors from a device-dependent color space into a device-independent color space using an intermediate population-dependent color space, so as to allow color matching between the two or more color output devices, such as color video monitors and/or color printers.

BACKGROUND OF THE INVENTION

It is common for two or more color output devices to be used in a system network configuration where they are interconnected for exchanging color images and/or data. In these configurations, it is often necessary to obtain a color match between all of the color output devices (e.g., color video monitors, color printers, etc.), particularly when a given color image is being processed by two or more of the color output devices. It may also be necessary for the colors that are displayed on the color output devices to match the colors that are produced by a color printer which is also coupled to the color output devices.

The range of color output of each color output device is called the "color gamut" and may be represented as an n-dimensional device-dependent color space where each dimension represents one of the principle colors of the space. For example, in a three-dimensional RGB color space the red (R), green (G), or blue (B) primary colors form a rectilinear coordinate system from which the color output of a color output device can be described. Each of the colors which can be produced by a particular color output device are represented by a point in the color gamut, and points outside the color gamut represent colors which cannot be produced by that particular color output device.

The problem of color matching can be understood using the individual color gamuts of a population of color output devices, for example VGA color monitors. Each color monitor has three electron guns, with each gun corresponding to one of the above primary colors and which stimulate red, green, and blue display phosphors to generate corresponding luminance values that are combined to produce a desired output color. The luminance of each primary color is determined by the intensity of stimulation of the phosphor which in theory can vary continuously from zero to some maximum value. However, in practice the luminance is quantized into a number of discrete levels and each level is encoded using a digital code. The digital luminance codes are stored in a computer memory and are used to control the intensity of stimulation by each electron gun.

The luminance for each electron gun of a particular color monitor can be measured using a photodetector, and a curve representing the relationship between the luminance value of the primary color generated by a particular gun and the digital code for that luminance value can be plotted. Using three such curves (one for each primary color), the color gamut for that color monitor can be obtained. The process can be repeated for each member of a population of color monitors to obtain similar luminance versus digital code curves and color gamuts for each color monitor. These color gamuts can then be compared to determine the relative range of color output for each monitor.

For example, to measure the luminance versus digital code curves of the population of color monitors having 64 color quantization levels (e.g. 6 bits per color per pixel), the contrast adjustment of each monitor is set to the maximum luminance (e.g., digital code=63). More specifically, the output color luminance at a maximum digital code of R=63, G=63, B=63 is set equal to a constant luminance such as 25 ft-lamberts. In this case, referring to FIG. 1, all color monitors of the population will have luminance versus digital code values which fall within a "white band" 11, with the corresponding red, green, and blue curves respectively falling within green band 14, red band 16 and blue band 18.

As further illustrated in FIG. 1, the red, green, and blue color bands 14, 16, and 18 of the population of color monitors are "fan shaped," as indicated by the spread 20 at digital code equal to 63. Further, if the green luminance versus digital code curve for a particular color monitor falls in the high side of the green band, the red luminance versus digital code curve for that color monitor will tend to fall in the low side of the red band. A different color monitor may have the opposite red and green curve characteristics. These differences in the luminance versus digital code characteristics cause color shifts to occur, even among color monitors of the same manufacturer and same model, making the achievement of a color match between the monitors difficult or impossible.

A comparison of the color gamuts of a population of color output devices will demonstrate three fundamental problems in achieving a color match between corresponding color output devices. First, different types of color output devices may require color spaces having different bases or dimensions. For example, the three-dimensional RGB color space is useful for color monitors since each of the three parameters corresponds to the physical mechanism by which the monitor generates the color. Similarly, the four-dimensional CMYK color space represents color using four parameters C, M, Y, K. In the case of printers there are three and sometimes four colorants, cyan, magenta, yellow and sometimes black. This notation is commonly used by printing devices since each parameter C,M,Y, and K determines the amount of a colorant (e.g. ink or dye) used by the printer in producing a desired color. Thus, in order to achieve a color match between different types of color output devices, their color gamuts must be transformed to a device-independent color space.

Second, even among a population of color output devices of the same type and whose color gamuts can be represented in the same color space, the relative size and/or shape of each color gamut will be different, indicating different ranges of color output capability. The areas where the color gamuts overlap indicate ranges of color output which can be achieved by each color monitor, while areas of non-overlap indicate areas which cannot be achieved by all of the monitors.

Third, even among color gamuts of the same size and shape, the distribution of color points within each color gamut will be different. Specifically, the color points within each color gamut are distributed in a non-uniform manner so that there will still be subtle differences in color forgiven point within the gamut of the monitors.

The second and third color matching problems can be understood by referring again to the luminance value versus binary code value curves of FIG. 1. Recall that each curve is a plot of luminance value versus digital code for a primary color of the color monitor. Although the digital code is the key independent variable used to select the luminance of the primary color, the color is also a function of several other variables which are not user or system controllable. For example, the age and type of phosphor, the age of the electron gun, and the individual component tolerances all affect the luminance values. Thus, as shown in FIG. 1, each curve will generally have a different overall slope resulting in a different maximum luminance value, and will be non-linear so that, although the digital codes are uniformly distributed, the corresponding luminance values will be non-uniformly distributed.

The present invention discloses a novel method and apparatus for transforming the device-dependent color gamuts of a population of color output devices to a device-independent color space, thus providing color matching between the color output devices.

SUMMARY OF THE INVENTION

The present invention is directed to a novel method and apparatus for calibrating color output devices, such as color monitors and color printers, in order to transform their color outputs from a device-dependent color space to a device-independent color space. With the present invention, the colors produced by each member of a population of color output devices can be calibrated to match one another.

In accordance with the present invention, the calibration method includes a step of determining the actual luminance versus digital code values and constructing corresponding curves and color gamuts for each member of the population of color output devices. Each of the curves for a particular color output device represents the relationship between the actual luminance values of a primary color produced by the color output device and the digital code values of for particular contrast and brightness adjustments of the color output device for that color. Each of the color gamuts for a particular color output device represents the range of color output values which can be generated by that device.

Before construction of the curves and color gamuts for a population of color output devices, the actual luminance versus digital code values for each member of the population must be determined. In some cases, the population characteristics for a particular model and/or models may be obtained from the manufacturer. The luminance values can then be determined from these color characteristics. In other cases, the luminance values must be measured and the individual curves for each color output device determined from these measurements.

The method also includes a step of establishing a set of first color correction transforms (e.g. tables) for each color output device of the population, in order to transform the color outputs of each device from their individual device-dependent color spaces to a population-dependent color space. Stated differently, the individual color gamuts of each color output device of the population are transformed to a single color gamut which every member of the population can achieve. This single color gamut is defined by a set of "aim curves", which are a set of luminance versus digital code curves designed such that, for each digital code value of a primary color, the corresponding luminance value is less than or equal to the lowest curve which comprises the primary color band (FIG. 1). The first color correction transforms are then derived from the aim curves along with the measured actual color curves for that color output device.

The step of establishing the first set of color correction transforms further includes a step of constructing the set of aim curves for each population of color output devices. As indicated above, an aim curve is established for each primary color of the color gamut, with each aim curve representing a relationship between the luminance values and the digital code values for that primary color which each color output device of the population can achieve. For example, for a color monitor the luminance values may be measured by first setting the brightness and contrast control to known and repeatable positions. Thus, each aim curve for a population of color monitors represents the relationship between the red (R), green (G), and blue (B) luminance values and the digital code value that each monitor can achieve. These values are for known and repeatable brightness and contrast adjustment.

The method further includes a step of establishing a second color correction transform for each population of color output devices, in order to transform the population-dependent color gamut to a device-independent color space, such as CIE-Luv or CIE-Lab. These device-independent color spaces allow color matching between different populations of color output devices and conform to standards defined by the International Commission on Illumination (CIE). Standards produced by the CIE are a concise documentation of light and lighting and are a primary source of internationally accepted and agreed data which can be taken, essentially unaltered, into universal standard systems.

In one embodiment of the present invention, the first and second color correction transforms for a particular color output device may be stored in an associated computer for use by an application or a device driver of that color output device. In an alternative embodiments, the correction tables can be made part of the application, device driver or device.

Stated more generally, the calibration method of the present invention can be used in any color space, such as RGB or CMYK, to bring each device-dependent color gamut to a single device-independent color space, such as CIE-Luv or CIE-Lab. The correction and calibration method of the present invention effectively compresses the device-dependent color gamuts to the population-dependent color gamut using correction tables, and then transforms the population-dependent color gamut to the device-independent color space, so that the color output of each of the color output devices (e.g., color monitors, color printers) match one another.

The present invention also includes an apparatus for establishing color correction transforms. In one embodiment, the apparatus includes a measuring device for measuring actual color luminance values of a color output device, a first storage device for storing the measured values and aim curves, a second storage device for storing control software or programs, and a host processor for communicating with the first and second storage devices and the measuring device for calculating the individual device correction transforms based on the measured actual color values and the aim curves.

In another embodiment of the present invention, a computer associated with each color output device to be calibrated is utilized. In this approach, the measuring device is connected directly to the computer and the control software is loaded into the computer to control the operation of the measuring device and the calculation of the individual device correction transforms.

In still another embodiment of the present invention, the measuring device is provided with a filtering device for filtering undesired light components from the light emitted by the color output device. The measuring device also includes a photodetector for sensing the light and converting it into a format which is suitable for calculating the actual luminance values. The measuring device may include a microprocessor connected to the photodetector for controlling the internal operation of the measuring device and for processing the signals generated by the photodetector to provide the measured signals in a digital format to the computer or host processor.

In still another embodiment of the present invention, the photodetector includes a light-to-frequency converter (LFC) which converts measured light into a squarewave signal. The frequency of the squarewave is a function of the actual luminance value of the measured light. In this embodiment, the microprocessor of the measuring device counts the number of cycles of the squarewave signal produced by the LFC for a particular measuring time, and provides the count to the host computer. The host computer calculates the luminance values based on the specified count and the measuring time.

These and other features and advantages of the present invention will become apparent after studying the following detailed description of the preferred embodiments taken in conjunction with the accompanying drawings.

DETAILED DESCRIPTION OF THE PREFERRED EMBODIMENTS

A method and apparatus are presented for color calibrating populations of two or more color output devices so that the color outputs of each of the devices match one another. More specifically, a set of first color correction transforms (e.g. each transform a color correction table for a different primary color) are established for each color output device by using a set of aim curves. The color correction transforms are used by the device driver of the color output device to transform the device-dependent color gamut of each color output device of the population to a population-dependent color gamut. A second set of color correction transforms are similarly used by the application or driver to transform the population-dependent color gamut of the population of color output devices to a device-independent color space in accordance with the teachings of the previously mentioned U.S. Pat. Nos. 4,958,220 and 4,979,032. Each of the color output devices is provided with a first color correction transform to ensure that the color gamuts of each device match, thus ensuring that the color outputs of each device will also match.

Figure 2:
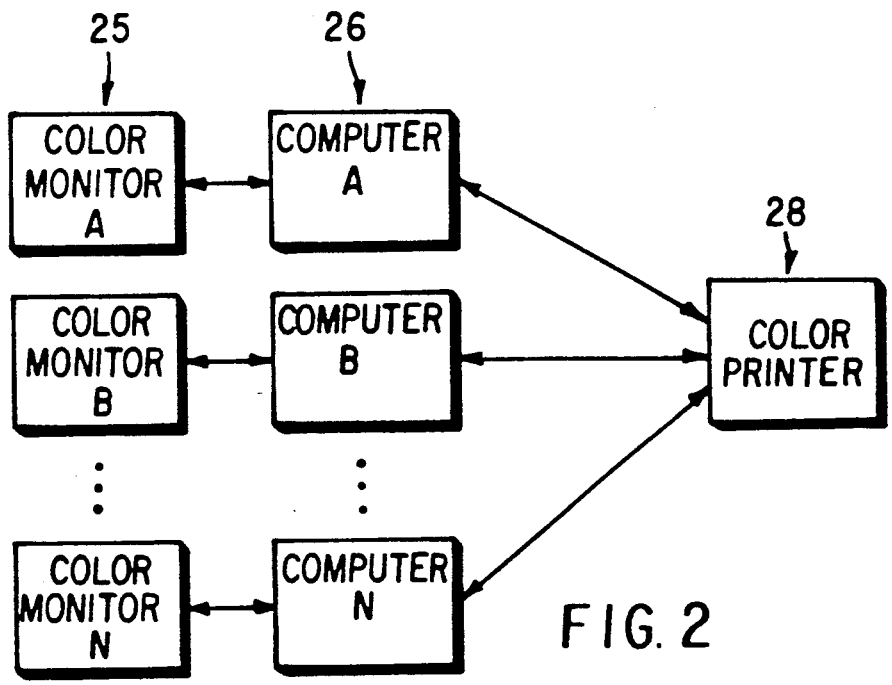
FIG. 2 illustrates a population of color monitors which share a color printer in accordance with the present invention.

Each population of color output devices may include color monitors, color printers, or similar devices. One application where the present invention may be utilized is illustrated in FIG. 2 which shows a group of color monitors 25A–25N that share a system color printer 28. Associated with each of the color monitors is a respective computer 26A–26N which may be provided with one or more user application programs. In this application, the present invention ensures that the color output from each of the color monitors 25A–25N match one another. In another application, the color monitors may all be connected to only a single host computer. Again, the present invention may be used to match the color output of each of the color monitors. The present invention may also be used to match the color output of all the color monitors to the color output of the system printer 28.

In the following discussion of various embodiments of the present invention color monitors, each having a three-dimensional red-green-blue (RGB) color gamut, are chosen as the color output devices for the of explaining the preferred embodiment. Modern color monitors encode their luminance using a digital code value. For example, a VGA monitor may be adjusted to a digital code between 0 and 63 (e.g. 64 levels per gun per pixel). Other types of color output devices, having other than RGB color gamuts, can be readily calibrated by those skilled in the art using the methods and apparatus of the present invention.

Referring again to FIG. 1, in an RGB color gamut each aim curve is associated with a primary color band: red 14, green 16, or blue 18, where each color band represents a distribution of luminance versus digital code value for a population of color monitors. Any color output requirement requested by a user application can find a corresponding point on one or more of the aim curves. Since the adjusted values of the luminance of a color monitor are in the form of a discrete digital code, each aim curve can be represented as a look-up table (LUT).

In accordance with the present invention the aim curves for the primary colors are always lower than, or equal to, the lowest curves of their corresponding color bands 14, 16, or 18. This is important because the luminance of a color monitor can not be driven above its maximum code value. Stated differently, a color monitor cannot produce colors that are outside of its color gamut. If the aim curves were set higher than their corresponding color bands, it would not be possible to drive the monitors' guns to a count of, say, 65 or 67, in order to eliminate the effect of the color shift between members of the population of color monitors. As long as each aim curve is equal to, or are lower than, its corresponding color band 14, 16, or 18 the guns can be driven to a lower count (code value) and thus made to match the aim curves. Note that taking an "average luminance curve" for each of the color, bands 14, 16, or 18 would make the "plus and minus" errors equal, but would not completely solve the color matching problem, since approximately half of the monitors would not be able to achieve all of the luminance values of the average curve.

In summary, the aim curves define a population-dependent color gamut which any of the color monitors can achieve. Individual gamut compression may occur in each color monitor in order to achieve the population-dependent color gamut specified by the aim curves. First color correction transforms are utilized to compress the color gamut of a particular monitor in order to achieve color matching with the other color monitors of the population.

Figure 1:
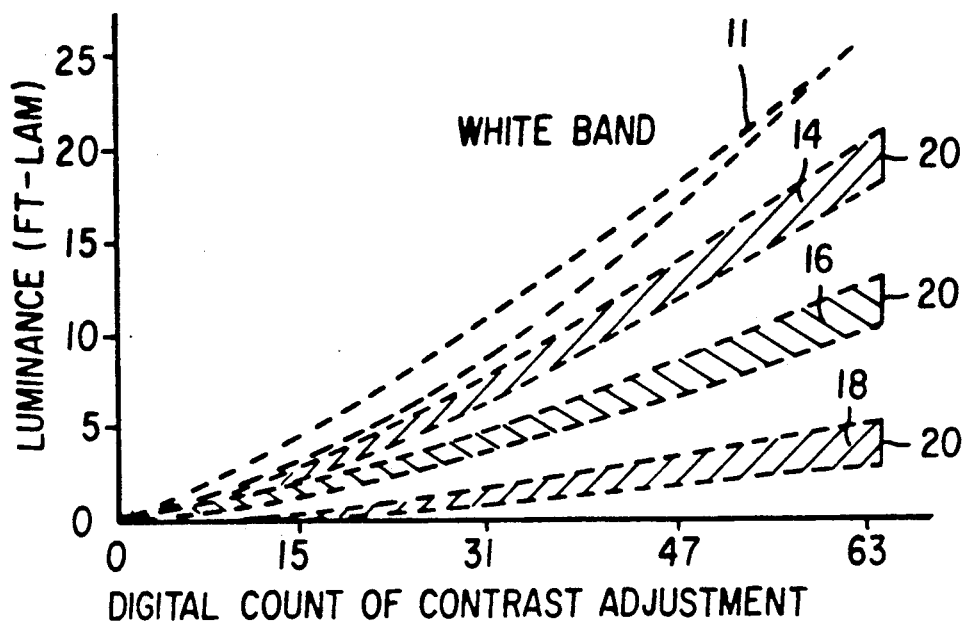
FIG. 1 illustrates respective color bands or populations of each of the primary colors for a population of color monitors. Each band represents the range of luminance values of a particular primary color for the population of monitors as a function of the digital code value.
Figure 3A:
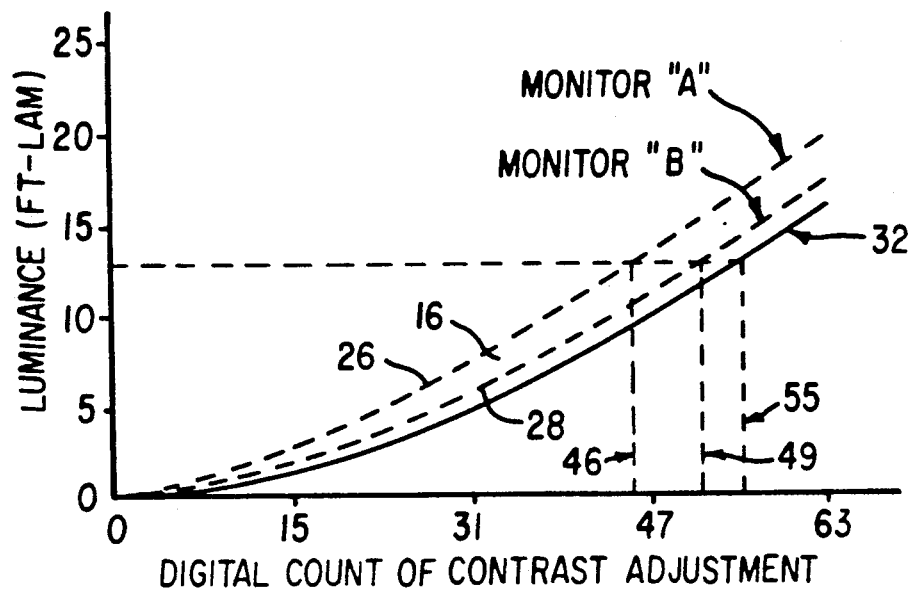
FIG. 3(a) illustrates an example of an aim curve which provides reference luminance values of a primary color for a population of color output devices in accordance with the present invention.

Referring now to FIGS. 3(a) and 1, a green aim curve 32 is exemplarily illustrated for green color band 16 of a population of color monitors. Green aim curve 32 represents a relationship between the green luminance values achievable by each member of the population and the digital code values. Curves A (26, FIG. 3(a)) and B (28, FIG. 3(a)) are actual green luminance versus digital code value curves respectively for color monitors A and B. Curve A represents the highest actual green luminance curve of green color band 16 for the population of color monitors as shown in FIG. 1. Similarly, curve B represents the lowest actual green luminance curve of green color band 16. In this example, green aim curve 32 is lower than actual green luminance curve B in the green color band 16.

In the preferred embodiment, three first color correction transforms (e.g. tables) are established for each color monitor of the population, based on three such aim curves derived, respectively, from the red, green, and blue color bands 14, 16, and 18 (FIG. 1) and each monitor's respective three actual luminance curves. A more detailed description regarding the construction of the first color correction transforms will now be provided with reference to Table 2. The set of aim curves established for a population of color monitors is used in the preparation of the first color correction transforms for each of the color monitors of the population. Each first color correction transform is associated with one of the primary colors (e.g. green, red and blue) for a particular color monitor.

Continuing with FIG. 3(a), assume that an application program requires a green patch corresponding to a digital code of 55. For the digital code of 55 on the aim curve, the corresponding luminance value should be 13 ft-lamberts. It can be seen from FIG. 3(a) that a first color correction table for monitor B will return a corrected digital code of 49 and a first color correction table for monitor A will return a corrected digital code of 46. Similarly, the first color correction tables for other color monitors comprising green color band 16 will also return corrected digital codes for their respective color monitors which have values between 46 and 49. As a result, all of the monitors including monitor A and monitor B will output a luminance value of 13 ft-lamberts for the requested count of 55 on green aim curve 32.

Figure 3B:
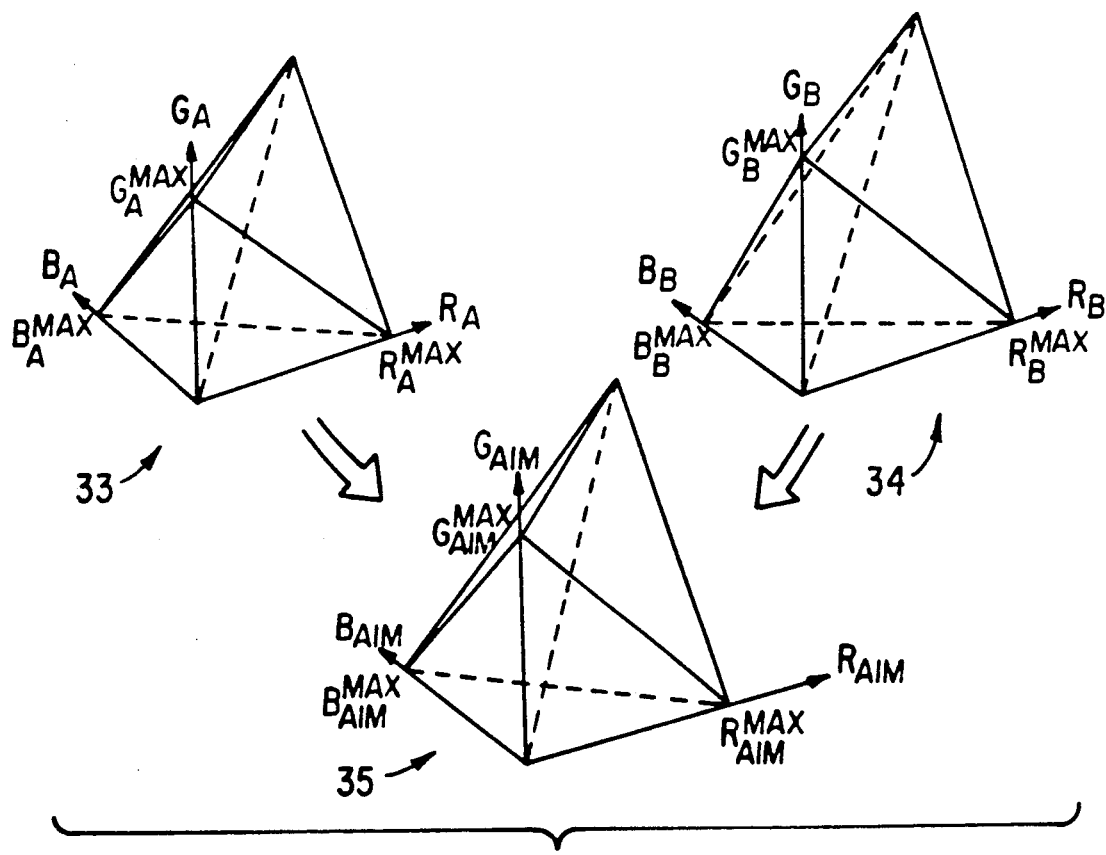
FIG. 3(b) shows device-dependent color gamuts for monitors A and B of FIG. 3(a), along with a population-dependent color gamut for a population of monitors which includes monitors A and B.

Referring now to FIG. 3(b), the effect of first color correction transforms in transforming the device-dependent color gamuts of each color monitor to the population-dependent color gamut is illustrated. FIG. 3(b) shows three-dimensional RGB device-dependent color gamuts 33 and 34 for monitors A and B of FIG. 3(a), along with their corresponding population-dependent color gamut 35. In FIG. 3(b), each dimension or axis of color gamuts 33-35 represents the luminance values of a corresponding primary color. The use of the first color correction transforms effectively compress color gamuts 33 and 34 so that their range of possible colors corresponds to color gamut 35. Another method for performing color gamut compression is described in the patent specification earlier incorporated by reference entitled COLOR IMAGE PROCESSING SYSTEM FOR PREPARING A COMPOSITE IMAGE TRANSFORMATION MODULE FOR PERFORMING A PLURALITY OF SELECTED IMAGE TRANSFORMATIONS, having U.S. Ser. No. 07/717,099.

Once each device-dependent color gamut has been transformed to a population-dependent color gamut, a second color correction transform is used to transform the population-dependent color gamut to a device-independent color space. A second color correction transform, also in the form of a table, is defined for each population of color output devices and provides for color matching among devices from any of the populations. The specific device-independent color spaces and their corresponding second color correction transforms are defined in the above-referenced CIE standards which have been incorporated herein by reference.

Figure 4:
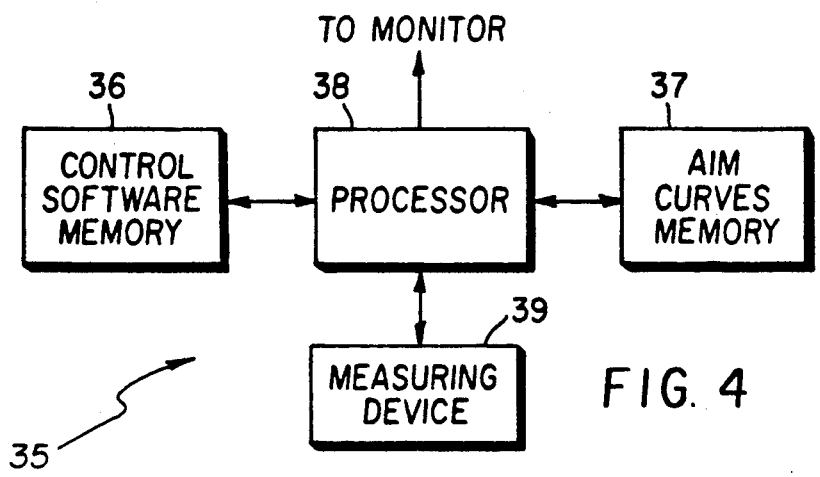
FIG. 4 is a block diagram illustrating a processor, luminance versus digital code measuring device configuration in accordance with the present invention.

Turning now to FIG. 4, an apparatus 35 which can measure the luminance values and construct first and second color correction transforms for any color output device or population of color output devices is shown. Apparatus 35 includes a luminance measuring device 39 (further described in FIGS. 6 and 7) for measuring the luminance values of each color output device of the population. For example, for a population of color monitors, luminance measuring device 39 is used to measure the luminance values of green, red and blue color patches generated by corresponding electron guns for a particular setting of the digital code of their associated contrast adjustments. The measured luminance values are digitized and sent to a processor 38 for producing the first and second color correction transforms. Aim curves are established based on a representative sample of the luminance values of the production population. The aim curves are stored in memory 37. The operation of processor 38 will be discussed in more detail with reference to FIGS. 8 and 9.

Apparatus 35 further includes a database 37 for storing at least one set of aim curves. For a selected population of color monitors having an RGB color gamut, a set of selected aim curves may comprise tables corresponding to a green aim curve, a red aim curve and a blue aim curve. Database 37 may also store multiple sets of aim curves for more than one population of color devices, where each population may include different product models from various manufacturers, each having different device-dependent color gamuts. Database 37 will typically be stored in a random-access memory (e.g., RAM) so that the aim curves can be revised, added and/or deleted as required.

Apparatus 35 further includes a storage member 36 for storing one or more application, utility, or control programs for controlling the processes necessary to construct the first color correction transform. Storage member 36 may be a read-only memory (ROM) or the same RAM as for storing the aim curves. Under software control, processor 38 calculates the first color correction transform for each of the color monitors based on the color luminance values measured by luminance measuring device 39 and the aim curves stored in database 37. The software may also be used by processor 38 to construct the aim curves based either on previously stored luminance, or on luminance values which have been measured by luminance measuring device 39 for a population color output devices.

Apparatus 35 may also include a storage member for buffering or storing the measured luminance values along with the constructed first color correction transform. The storage member may also be a part of the same RAM for storing the aim curves and the control software. It should also be understood that a personal computer may be used to replace devices 36, 37, 38 as shown in FIG. 5.

Each set of first color correction transform constructed by apparatus 35 is loaded into an associated color monitor for use by the monitor driver. The monitor driver uses the first color correction transforms to transform the device-dependent color gamut of that monitor to a device-independent color space. Since the monitor drivers of all of the color monitors of a given population have first color correction transforms based on the same set of aim curves, the color outputs produced by all the monitors of that population will match one another.

Figure 5:
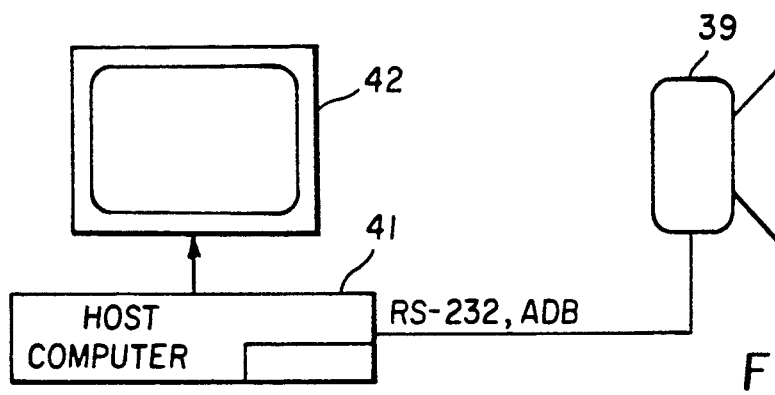
FIG. 5 shows a preferred embodiment of a host computer, luminance versus digital code measuring device configuration in accordance with the present invention.

In FIG. 5, a computer 41 replaces control software storage member 36, aim curve storage member 37 and processor 38 in the embodiment shown in FIG. 4 to form a commercial embodiment of the present invention. Computer 41 may comprise, for example, an IBM personal computer or an Apple Macintosh which is connected to a color monitor 42 which is to be calibrated. Using this configuration, luminance measuring device 39 can be coupled directly to computer 41 through a standard interface, such as RS-232 or an Apple connector (ADB). Before beginning operation, the control software and the aim curves must also be loaded into the memory of computer 41.

Figure 6:
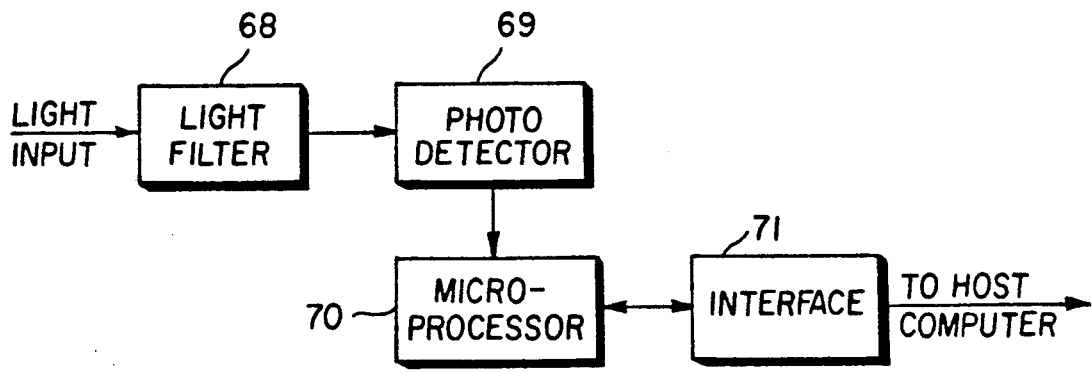
FIG. 6 is a block diagram illustrating a preferred embodiment of the luminance versus digital code curve measuring device utilized with the embodiments of the present invention as illustrated in FIGS. 4 and 5.

FIG. 6 shows a more detailed embodiment of luminance measuring device 39 (as shown in FIGS. 4 and 5) which is used in the apparatus of the present invention. Luminance measuring device 39 comprises a light filtering member 65 for removing undesired light components and passing desired light components to a photodetector 69 for measurement. Photodetector 69 is provided for sensing the light and converting it into a format suitable for further processing by processor 38. Luminance measuring device 39 may include a dedicated microprocessor 70 for pre-processing the output of photodetector 69 and generating a digital signal which encodes the measured luminance values. The digital signal from microprocessor 70 is then sent to computer 41 through an interface member 71 (e.g. RS-232 etc.) for further processing in order to construct the first color correction transforms.

Figure 7:
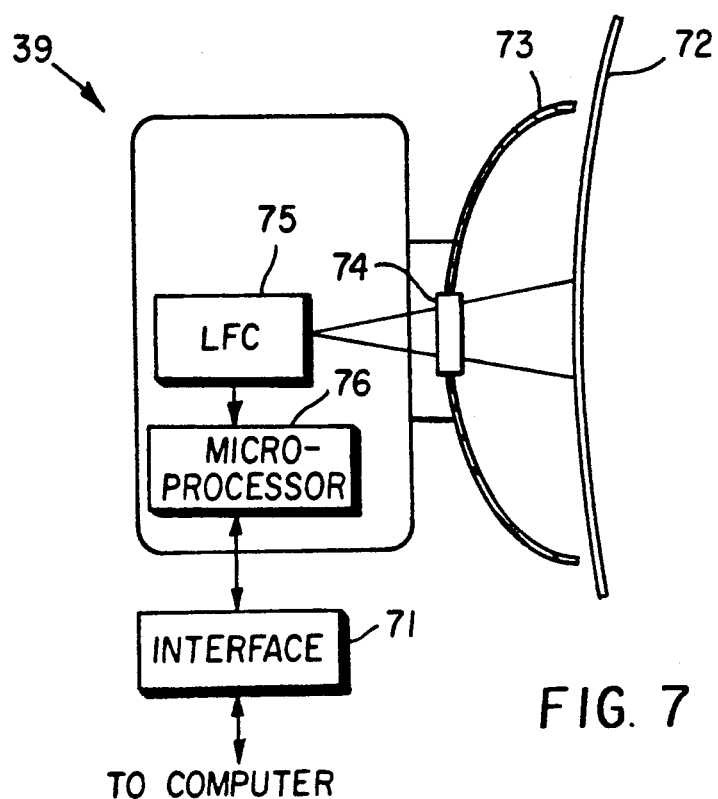
FIG. 7 illustrates a more detailed embodiment of the luminance versus digital code measuring device for measuring actual color curves as shown in FIG. 6.

A more detailed illustration of measuring device 39 is shown in FIG. 7. Luminance measuring device 39 includes a suction cup 73 for fixing measuring device 39 on the glass surface of a color monitor 72. A light filter 74 is disposed in suction cup 73 between color monitor 72 and photodetector 69, for passing the light emitted by a color patch on monitor 72 while removing any undesired light components, such as ultraviolet (UV) and/or infrared (IR). The color patch on monitor 72 is created by an electron beam generated by one or more of the electron guns of monitor 72. Before each measurement, an electron gun is adjusted to a specific digital count by computer 41 and the digital count is recorded.

Continuing with FIG. 7, a light-to-frequency converter (LFC) 75 is provided to convert the luminance of the sensed light passing through light filter 74 into a corresponding squarewave signal whose frequency is proportional to the measured luminance of the light (e.g. the frequency is an approximately linear function of the luminance of the light signal). Each cycle of the squarewave signal is called an "LFC count". Since the electron guns are designed to refresh the monitor screen about 60 times per second, the luminance of a particular color patch varies as the color gun scans across the monitor screen from top to bottom. A microprocessor 76 is provided to determine the exact refresh rate and synchronize the measurement process with the scanning. Microprocessor 76 also determines an integration time and calculates a luminance count using the equation:

luminance count = LFC count/integration time.

A single luminance count may be used to determine a measured luminance value by referring to an LFC count-to-luminance look-up table (see Table 1). However, in order to further enhance the accuracy of the measurement, several measurements may be obtained and averaged to produce an average luminance count. The average luminance count is then used to determine the measured luminance value from the LFC count-to-luminance look-up table for the primary color. The measured luminance value also corresponds to a specific digital code value since during each measurement of a luminance value a specific contrast adjustment (and corresponding digital code) is selected. An example of a portion of an LFC count-to-luminance look-up table is shown in Table 1.

TABLE 1

| Digital Code | LFC Count (ft-lam) | Measured Luminance (ft-lam) |
|---|---|---|
| 50 | 127 | 10.4 |
| 51 | 130 | 10.6 |
| 52 | 133 | 10.8 |
| 53 | 136 | 11.0 |
| 54 | 139 | 11.4 |

From Table 1 one can see that both the digital codes and the measured luminance values are discrete in value. Thus, the measured luminance versus digital code curves can be stored in the form of look-up tables for use in constructing the first color correction transforms.

The above-described measurement process is repeated for all digital codes of each primary color. The measured luminance values are then used by computer 41 for establishing the first color correction transforms for the particular color monitor. The calculation and averaging steps can also be done by computer 41 so that measuring device 39 need not perform these steps. Instead, the LFC count for each integration time is simply sent from measuring device 39 to computer 41 where the luminance count is determined.

As an alternative, luminance values for each primary color can be measured simultaneously. In this approach, all three electron guns are turned on simultaneously to produce a combined output color patch on the color monitor display, and the red, green and blue lumination components are separately measured. Alternatively, three separate and three separate filters may be provided allowing for simultaneous measurement of all three color components.

Figure 8:
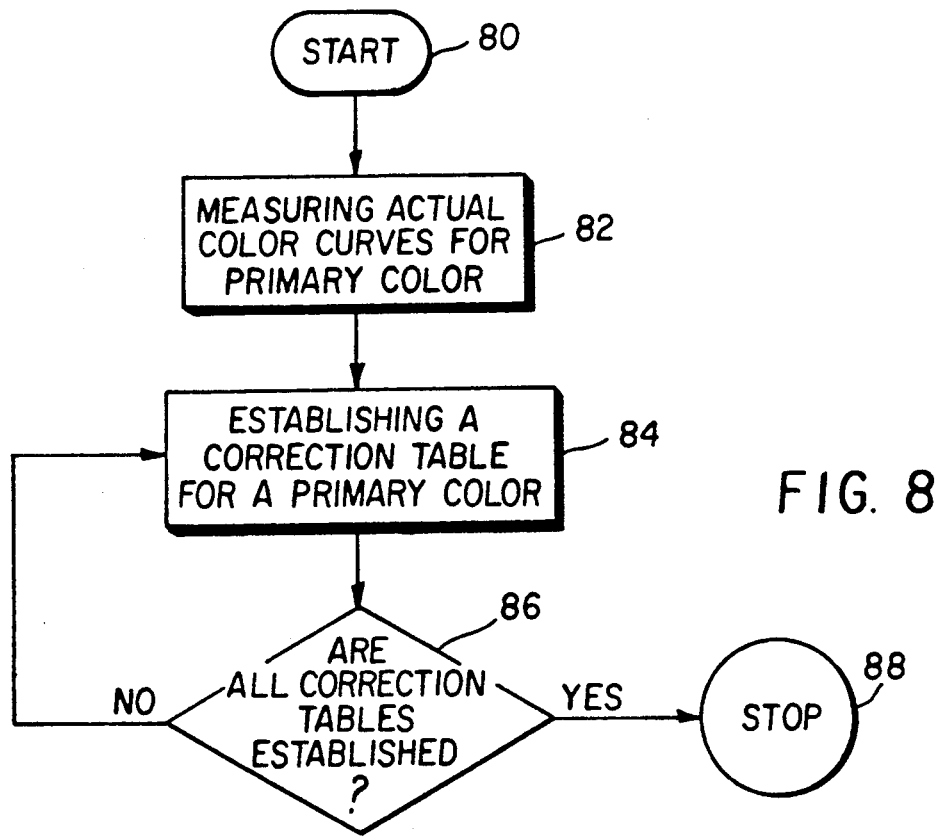
FIG. 8 is a flow chart illustrating a preferred embodiment of the steps performed for controlling the formation of correction transforms in accordance with the present invention.

FIG. 8 shows a flow chart of an embodiment of control software for controlling the operation of apparatus 35. After initializing apparatus 35 at block 70, processing continues at block 82 where the luminance values for one of the primary colors are measured. When the measurement process is complete, processing continues at block 84 where the first color correction transforms for that primary color are constructed using the associated aim curve and the measured luminance values. Then, at block 86, a decision is made as to whether all first color correction transforms for all primary colors have been constructed. If all color correction transforms have been constructed, processing ends at block 88. If not, the process continues at blocks 84-86 until all first color correction transforms for the primary colors of that particular monitor have been constructed.

Figure 9:
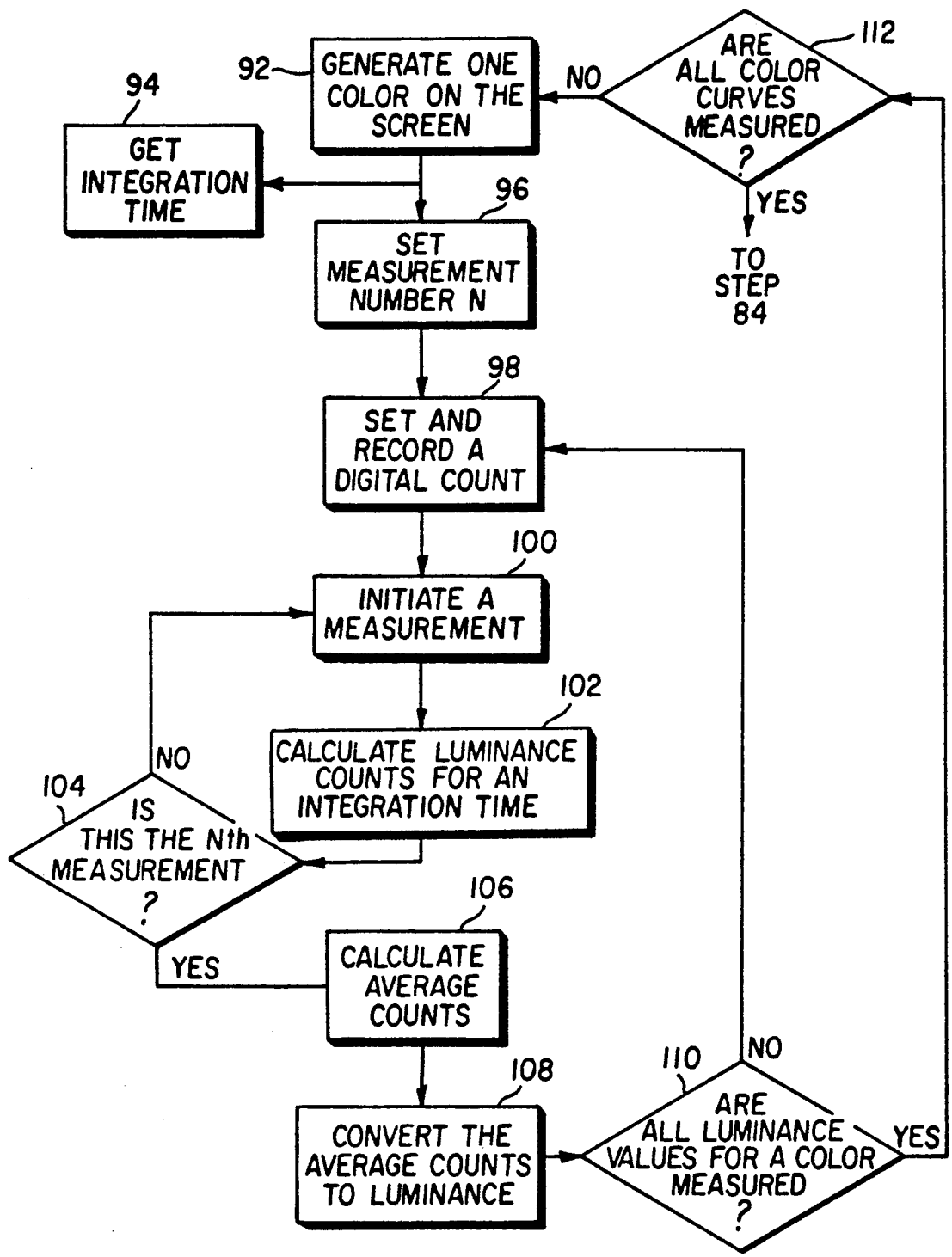
FIG. 9 is a flow chart illustrating a preferred embodiment of the steps performed for measuring actual luminance values for color output devices in accordance with the present invention.

FIG. 9 shows a more detailed flow chart of the process for measuring the luminance values of each primary color as generally indicated by block 82 of FIG. 8. The measurement process begins at block 92 where one electron gun is turned on to generate a primary color patch on the color monitor. Processing continues at block 94 where a command is issued to measuring device 39 to determine the refresh rate and integration time, and return the determined integration time. Then, processing continues at block 96 where N, the number of measurements to be averaged, is set. At block 98, a luminance and corresponding digital code is selected and stored.

Continuing with FIG. 9, at block 100 a command is issued to measuring device 39 to measure a luminance value and return a corresponding LFC count to computer 41, using a measurement period of one integration time. When computer 41 has received the corresponding LFC count for the luminance value measurement from measuring device 39, processing continues at block 102 where computer 41 calculates a luminance count using the returned LFC count and previously computed integration time. Processing then continues at block 104 to determine whether the current measurement is the Nth measurement. If it is not the Nth measurement, processing continues at blocks 100-104 until N luminance counts have been computed and stored. If it is the Nth measurement, processing continues at block 106 where the average of the N luminance counts for that recorded digital code of the contrast adjustment is determined.

Processing then continues at block 108 where the average luminance count is used to search the LFC count-to-luminance look-up table to determine a corresponding luminance value. After a corresponding luminance value has been determined for a specific digital code, processing continues at block 110 where a decision is made as to whether all luminance values for all digital code values of the particular primary color have been determined. If not, processing continues at blocks 98-108 until all luminance values for all digital code values for the primary color have been determined.

When all luminance values for the primary color have been determined, processing continues at block 112 where a decision is made as to whether the luminance measuring process has been completed for all the primary colors. If it has not, processing continues at blocks 92-110 until the process has been completed for all primary colors. However, block 94 is bypassed for the subsequent primary colors since the integration time has already been determined. When the luminance measuring process has been completed for all the primary colors, processing stops at block 88.

In the embodiments of the measurement and control software as shown in FIGS. 8 and 9, the aim curves are assumed to have been previously determined and stored in the memory of computer 41. If the aim curves have not been previously stored, the software can also include steps for determining the aim curves based on the measured luminance values for the population of color monitors which are to be calibrated when used in a quality assurance function.

As discussed above, after measurement of all luminance values for a particular color monitor, the first color correction transforms is constructed. This process involves searching the measured luminance values (e.g. luminance versus digital code tables) and the aim curves (e.g. aim curve tables). The process of constructing the first color correction transforms can be easily understood by reference to Table 2 (only a portion is exemplarily illustrated).

TABLE 2

| Digital Code | Measured Luminance (ft-lam) | Aim Curve (ft-lam) |
|---|---|---|
| 50 | 10.4 | 9.0 |
| 51 | 10.6 | 9.3 |
| 52 | 10.8 | 9.6 |
| 53 | 11.0 | 10.0 |
| 54 | 11.4 | 10.4 |
| 55 | 11.8 | 10.8 |

During construction of a first color correction transform for a primary color, all measured luminance values and their corresponding digital codes are used. For example, suppose a reference luminance value on the aim curve is 10.8 ft-lamberts. A measured luminance value of 10.8 ft-lamberts for a particular color monitor can be found in the second column of Table 2 which corresponds to digital code 52. Thus, whenever a user application program outputs a primary color digital code value the monitor driver searches in the color correction table to find a corresponding digital count for adjustment of the code value for that color.

Since each aim curve is lower than, or equal to, the lowest luminance versus digital code curve of its corresponding color band for a population of color monitors, all luminance values of the aim curve can be achieved by any of the color monitors of that population. In this case, all the color monitors with their respective first color correction transforms can produce the matching colors as required by a user application program.

Although part of this invention is described mainly by reference to the computer color monitors, it would be obvious that the basic concept of the invention can also be used to calibrate the color printers and other types of color output devices. What has been described above are the preferred embodiments of a method and apparatus for providing color matching between color output devices. It would be apparent that many modifications to the disclosed invention are possible without departing from the true spirit and scope of the invention.

We claim:

1. A method for providing color matching among populations of color output devices, each population being comprised of a different type of device and each population including two or more color output devices of a same type, and each member of said population of said color output devices having a device-dependent color gamut, said method comprising the steps of:

forming a set of aim curves for each population of the color output devices;

constructing a first set of color correction transforms based on said set of aim curves for each population of the color output devices, said first set of color correction transforms for transforming said device-dependent color gamut of each of said color output devices to a population-dependent color gamut;

constructing a second set of color correction transforms for transforming each population-dependent color gamut to a device-independent color space; and calibrating output colors of each of said color output devices using said first and second sets of color correction transforms.

2. The method of claim 1 further comprising the step of measuring luminance values and determining corresponding luminance versus digital code value curves for each primary color of said color output devices.

3. The method of claim 2, wherein said step of constructing said first set of color correction transforms further comprised the step of comparing said measured color luminance versus digital code value curves with said aim curves to determine said first set of color correction transforms.

4. The method of claim 2, wherein said step of forming said set of aim curves further comprises the step of forming said aim curves which are less than, or equal to, the lowest of the measured luminance versus digital code curves for each of said color output devices.

5. The method of claim 1, wherein said color output devices of one type comprise color monitors.

6. The method of claim 1, wherein said color output devices of one type comprise at least one color printer.

7. The method of claim 1, wherein said color output devices of different types comprise one or more color monitors as a first type and at least one color printer as a second type.

8. The method of claim 1 further comprising the step of providing said first and second color correction transforms to device drivers of said color output devices.

9. An apparatus for providing color matching among populations of color output devices, each population being comprised of a different type of device and each population including two or more color output devices of a same type, and each of said color output devices having a device-dependent color gamut, said apparatus comprising:

means for forming a set of aim curves for each population of color output devices;

means for constructing a first set of color correction transforms based on said set of aim curves for each population of color output devices, said first set of color correction transforms for transforming said device-dependent color gamut of each of said color output devices to a population-dependent color gamut;

means for constructing a second set of color correction transforms for transforming each population-dependent color gamut of each population of said color output devices to a device-independent color space; and means for calibrating output colors of each of said color output devices in accordance with said first and second sets of color correction transforms.

10. The apparatus of claim 9 further comprising means for measuring luminance values and determining corresponding luminance versus digital code value curves for each primary color of said color output devices.

11. The apparatus of claim 10, wherein said means for constructing said first set of color correction transforms further comprises means for comparing said measured color luminance versus digital code value curves with said aim curves to determine said first set of color correction transforms.

12. The apparatus of claim 10, wherein said means for forming said set of aim curves further comprises means for forming said aim curves which are less than, or equal to, the lowest of the measured luminance versus digital code curves for each of said color output devices.

13. The apparatus of claim 9 further comprising means for providing said first and second color correction transforms to device drivers of said color output devices.

14. An apparatus for providing color matching among populations of color output devices, each population being comprised of a different type of device and each population including two or more color output devices of a same type, and each of said color output devices having a device-dependent color gamut, said apparatus comprising:
    means for measuring luminance versus digital code value curves for each primary color of said color output devices; and
    means for constructing first and second color correction transforms for transforming each device-dependent color gamut to a population dependent gamut and to a device-independent color space.

15. The apparatus of claim 14 further comprising a first memory means for storing color aim curves and a second memory means for storing control software for controlling the operation of said apparatus.

16. The apparatus of claim 14 wherein said means for constructing includes a processor.

17. The apparatus of claim 14 further comprising means for forming said aim curves based on said measured luminance values of said at least two of said color output devices.

18. A method for providing color matching between at least two color output devices each of a different type, each of said at least two color output devices having a device-dependent color gamut, said method comprising the steps of:
    measuring color luminance values of a set of primary colors for each of said at least two color output devices;
    forming an aim curve for each of said set of primary colors, each of said aim curves being achieveable by each of said at least two color output devices forming an achievable device-dependent color gamut for each device;
    forming a device dependent color space to device independent color space transform for transforming the achievable device-dependent color gamut to the device independent color space;
    constructing respective combined color correction transforms for each of said at least two color output devices in accordance with said measured color luminance values, said aim curves and said device dependent color space to device independent color space transforms of each of said at least two color output devices; and
    providing said respective combined color correction transforms to each of said at least two color output devices for transforming colors of said device-dependent color gamut to a device-independent color space.

19. The method of claim 18 wherein said step of forming said aim curves further comprises the step of forming said aim curves based on said color luminance values of said at least two color output devices.

20. The method of claim 18 wherein said color output devices include at least one color printer.

21. The method of claim 18 wherein said step of forming said aim curves further comprises the step of forming each of said aim curves to be lower than, or equal to, a lowest measured color luminance curve for a primary color.

22. A method for providing color matching between at least two color output devices each of a different type, each of said at least two color output devices having a device-dependent color gamut, said method comprising the steps of:
    measuring color luminance values of a set of primary colors for each of said at least two color output devices;
    forming an aim curve for each of said set of primary colors, each of said aim curves being achieveable by each of said at least two color output devices;
    constructing respective color correction transforms for each of said at least two color output devices in accordance with said measured color luminance values and said aim curves of each of said at least two color output devices; and
    providing said respective color correction transforms to each of said at least two color output devices for transforming colors of said device-dependent color gamut to a device-independent color space; and
    wherein said color output devices include color monitors of two different types.

23. A method for providing color matching between at least two color output devices each of a different type, each of said at least two color output devices having a device-dependent color gamut, said method comprising the steps of:
    measuring color luminance values of a set of primary colors for each of said at least two color output devices;
    forming an aim curve for each of said set of primary colors, each of said aim curves being achieveable by each of said at least two color output devices;
    constructing respective color correction transforms for each of said at least two color output devices in accordance with said measured color luminance values and said aim curves of each of said at least two color output devices; and
    providing said respective color correction transforms to each of said at least two color output devices for transforming colors of said device-dependent color gamut to a device-independent color space; and
    wherein said color output devices include both computer color monitors as a first type and at least one color printer as a second type.

24. An apparatus for providing color correction transforms to match a color output device to a population of color output devices of a same type, comprising:
    means for measuring color luminance values in a device-dependent color gamut for said color output device;
    means for forming population dependent color aim curves; and
    means for constructing said color correction transforms for said color output device in accordance with said color aim curves and said measured color luminance values of said color output device.

25. The apparatus of claim 24 wherein said constructing means includes a processor.

26. The apparatus of claim 24 wherein said constructing means is also used for forming said color aim curves based on said measured color luminance values of said color output device.

27. The apparatus of claim 24 wherein said means for measuring further comprises a photodetector means for sensing light generated by said color output device.

28. The apparatus of claim 24 wherein said means for measuring further comprises a light filter means for selectively passing light to be measured.

29. The apparatus of claim 27 wherein said photodetector means further comprises a light-to-frequency converter.

30. The apparatus of claim 24 wherein said color output device comprises one of a color monitor and a color printer.

31. A method for providing color matching among a population of color output devices, said population including two or more of said color output devices, of a same type, and each member of said population of said color output devices having a device-dependent color gamut, said method comprising the steps of:

forming a set of aim curves for said population of said color output devices;

constructing a set of color correction transforms based on said set of aim curves for the population of the color output devices, said set of color correction transforms for transforming said device-dependent color gamut of each of said color output devices to a population-dependent color gamut; and calibrating output colors of each of said color output devices using said set of color correction transforms.

32. An apparatus for providing color matching among a population of color output devices, said population including two or more of said color output devices of a same type, and each of said color output devices having a device-dependent color gamut, said apparatus comprising:

means for forming a set of aim curves for said population;

means for constructing a set of color correction transforms based on said set of aim curves for said population of color output devices, said set of color correction transforms for transforming said device-dependent color gamut of each of said color output devices to a population-dependent color gamut; and means for calibrating output colors of each of said color output devices in accordance with said set of color correction transforms.

33. An apparatus for providing color matching among a population of color output devices, said population including two or more of said color output devices of a same type, and each of said color output devices having a device-dependent color gamut, said apparatus comprising:

means for measuring luminance values and determining corresponding luminance versus digital code value curves for each primary color of said color output devices; and means for constructing color correction transforms for transforming said device-dependent color gamuts to a population-dependent color gamut.

34. A method for providing color matching between at least two color output devices of a same type in a population, each of said at least color output devices having a device-dependent color gamut, said method comprising the steps of:

measuring color luminance values of a set of primary colors for each of said at least two color output devices;

forming an aim curve for each of said set of primary colors, each of said aim curves being achieveable by each of said at least two color output devices;

constructing respective color correction transforms for each of said at least two color output devices in accordance with said measured color luminance values and said aim curves of each of said at least two color output devices; and providing said respective color correction transforms to each of said at least two color output devices for transforming colors of said device-dependent color gamut to a population dependent color gamut.

* * * * *